(12) United States Patent
Reisgies

(10) Patent No.: US 7,426,398 B2
(45) Date of Patent: Sep. 16, 2008

(54) EVENT CONTROL SYSTEM AND METHOD FOR A MOBILE COMMUNICATION NETWORK

(75) Inventor: Hans Reisgies, San Jose, CA (US)

(73) Assignee: IXI Mobile (R&D), Ltd. (IL)

(\*) Notice: Subject to any disclaimer, the term of this patent is extended or adjusted under 35 U.S.C. 154(b) by 0 days.

(21) Appl. No.: 11/097,892

(22) Filed: Apr. 1, 2005

(65) Prior Publication Data

US 2006/0223553 A1    Oct. 5, 2006

(51) Int. Cl.
*H04M 3/00* (2006.01)

(52) U.S. Cl. .............. 455/466; 455/418; 455/566; 455/414.1; 455/558; 455/422.1

(58) Field of Classification Search ............ 455/466, 455/566, 414.1; 379/219, 245
See application file for complete search history.

(56) References Cited

U.S. PATENT DOCUMENTS

| 5,920,271 | A  | * | 7/1999 | Hwang | 340/7.52 |
| 6,914,965 | B1 | * | 7/2005 | Grob et al. | 455/422.1 |
| 2003/0190030 | A1 | * | 10/2003 | Alton | 379/219 |
| 2005/0113139 | A1 | * | 5/2005 | Boss et al. | 455/558 |
| 2005/0143108 | A1 | * | 6/2005 | Seo et al. | 455/466 |
| 2005/0251393 | A1 | * | 11/2005 | Georgescu | 704/270.1 |

\* cited by examiner

*Primary Examiner*—David Q Nguyen
(74) *Attorney, Agent, or Firm*—Century IP Group, Inc.; F. Jason Far-hadian

(57) ABSTRACT

A system for controlling an event on a mobile communication device is provided. The system comprising at least one circuit for receiving a message communicated over a wireless communication network; and at least one circuit for converting the message to a command executable by a processor of a mobile communication device to trigger performance of a first event on the mobile communication device.

15 Claims, 3 Drawing Sheets

Hardware Environment 1110

Software Environment 1120

EVENT CONTROL SYSTEM AND METHOD FOR A MOBILE COMMUNICATION NETWORK

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

BACKGROUND

1. Field of Invention

The present invention relates generally to mobile communication services and, more particularly, to a system and method for remotely controlling events on a mobile communications device communicating in a wireless communication network.

2. Related Art

Devices such as personal digital assistants (PDAs) and cellular phones, or a combination of the two, are used for calendaring events, sending text messages, storing contact information, etc. Most such devices are also configured for data synchronization with another device, such as a desktop computer for example, so that the data stored in the two devices are periodically updated when the synchronization process is performed.

Unfortunately, the synchronization process is inconvenient, in that it requires the user to periodically connect the devices to each other and execute a software application so that the information between the devices is updated. Some of the current systems have automated some of the steps involved in the synchronization process so that all that is needed for the user is to place the device into a cradle connected to the computer (e.g., by way of a cable, Bluetooth, or infrared) and press a button.

Regardless of the above implementations, the fact remains that a user will have to remember to synchronize the devices every time the data in one of the devices is updated (i.e., at least on a daily basis). When a user has multiple devices to be synchronized, the synchronization process becomes even more tedious and to some extent confusing, as the user can lose track of the devices that are synchronized and run the risk of loosing precious data.

Further, the related art systems noted above provide only a data synchronization capability between the devices. That is, said data synchronization options can be used to update only contact or calendar information and related events specific to certain proprietary organization software, such as Microsoft Outlook. Thus, the current systems do not allow a user to remotely schedule, control or manipulate other events (i.e., initiating a phone call, accessing a webpage, etc.) that the communication device can perform.

A method or system is needed that can overcome the above problems.

SUMMARY

One or more embodiments of the present invention are directed to a method of controlling events on a mobile communication device.

For purposes of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, the method of controlling an event on a mobile communication device, comprises receiving a text message communicated over a wireless communication network; and converting the text message to a command executable by a processor of a mobile communication device to trigger performance of a first event on the mobile communication device.

In one embodiment, the receiving and the converting is performed by the mobile communication device. The text message can be communicated over short text messaging (SMS) protocol. In certain embodiments, the wireless communication network comprises a cellular communication network.

In accordance with yet another embodiment, a method of controlling an event on a mobile communication device comprises receiving a message communicated over a wireless communication network; and converting the message to a command executable by a processor of a mobile communication device to trigger performance of a first event on the mobile communication device.

The mobile communication device can be a cellular telephone. The first event may comprise updating data stored on the mobile communication device or initiating a telephone call based on information included in the message. The message is a text message, in one embodiment, and is communicated, for example, over a text messaging communication protocol, such as a short messaging service (SMS) protocol.

In accordance with another embodiment, an apparatus for controlling an event on a mobile communication device is provided. The apparatus comprises one or more circuits for receiving a message communicated over a wireless communication network; and for converting the message to a command executable by a processor of a mobile communication device to trigger performance of a first event on the mobile communication device.

The mobile communication device may be a cellular telephone. The first event may comprise updating data stored on the mobile communication device or initiating a telephone call based on information included in the message. The message can be a text message communicated over a text messaging communication protocol, such as short messaging service (SMS) protocol.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

An electronic system and corresponding methods, according to an embodiment of the present invention, facilitate and provide an automatic real time update system for controlling events of a mobile device in a communications network.

The terms electronic services, services, network services and online services are used interchangeably herein. The services provided by the system of this invention, in one or more embodiments, are provided by a service provider. A service provider is an entity that operates and maintains the computing systems and environment, such as server systems and infrastructure that enable the delivery of information and services. Typically, server architecture comprises of components (e.g., hardware, software, and communication lines) that store and offer electronic or online data, text and voice communication services.

In the following, numerous specific details are set forth to provide a thorough description of various embodiments of the invention. Certain embodiments of the invention may be practiced without these specific details or with some variations in detail. In some instances, features not pertinent to the novelty of the system are described in less detail so as not to obscure other aspects of the invention.

Figure 1:
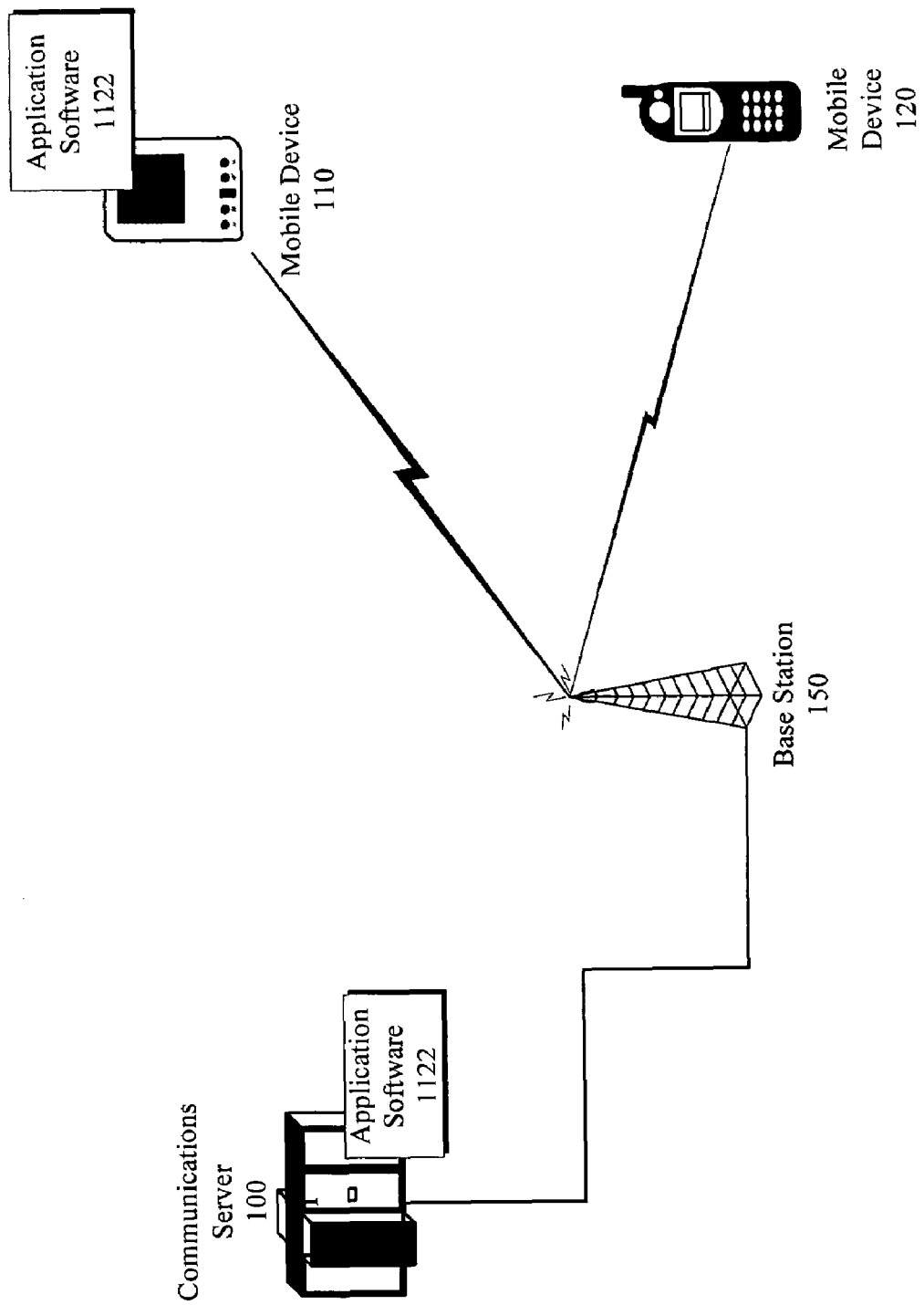
FIG. 1 illustrates an exemplary communications environment in accordance with one or more embodiments of the invention.

Referring to the drawings, FIG. 1 illustrates an exemplary communications environment in which the system of the present invention may operate. In accordance with one aspect of the system, the environment comprises plurality of mobile devices (e.g. device 110, device 120, etc.) that communicate with a communications server 100, via a base station 150, for example.

Communications server 100, in accordance with one embodiment, provides commands, requests, data or text messaging service (e.g., instant messaging, short messaging, etc.), and may comprise or be coupled to one or more databases (not shown), for example, to control events or update data stored on mobile communication devices 110, 120. Said data or events may be associated with or comprise one or more processes configured to update and store appointment data, phone numbers, alarm tones, special functions or other related configuration information on mobile devices 110, 120. The terms "connected," "coupled," or any variant thereof, mean any connection or coupling, either direct or indirect, between two or more elements. The coupling or connection between the elements can be physical, logical, or a combination thereof.

Communications server 100, in accordance with one embodiment, may comprise or be connected or coupled to one or more computer systems or databases (not shown), for example, to receive configuration, command or update information for mobile device 110, 120. Communication server 100 may communicate with mobile device 110, 120 and the respective computing systems or databases via a direct point-to-point connection or a remote internet connection, for example.

The communication protocol for establishing said communication connections and data transfer may be implemented over any wired or wireless telephony or communication protocol (e.g., Internet Protocol (IP), Transmission Control Protocol over IP (TCP/IP), User Datagram Protocol over IP (UDP/IP), Short Messaging Service (SMS), Instant Messaging Service (IM)) or any combination thereof.

Referring back to FIG. 1, the exemplary communications network illustrated therein provides the medium and infrastructure (i.e., base station 150) for transmitting digital or analog voice and data signals between communications server 100 and mobile devices 110, 120. In certain embodiments, mobile devices 110, 120 are cellular telephones communicating in a cellular telephone network with communication server 100. Communication server 100 as discussed may be connected to other databases or computing systems via the Internet, for example.

One of ordinary skill in the art will appreciate that the communications network of the invention may advantageously be comprised of one or a combination of various types of networks without departing from the scope of the invention. For example, in some embodiments, the communications network can comprise one or more local area networks (LANs), wide area networks (WANs), public, private or secure networks, value-added networks, interactive television networks, wireless communications networks, two-way cable networks, satellite networks, interactive kiosk networks, cellular networks, personal mobile gateways (PMGs) and/or any other suitable communications network or part of the world wide web (i.e., the Internet).

In either context, mobile devices 110 or 120 can communicate with a service provider to send and receive electronic packets of information, in the form of electronic requests and responses. In one embodiment, the service provider is a wireless communications service provider (e.g., Sprint, Cingular, T-mobil or Verizon) to which a user may subscribe.

Some of the services provided by the system of the present invention may be implemented as application software 1122 installed and executed on mobile devices 110, 120, as provided in further detail below. In certain embodiments, the application software 1122 executed on mobile devices 110 or 120 can act as client software that is in communication with communications server 100 or a service provider, for example.

Alternatively, in some embodiments, mobile devices 110 or 120 may comprise a PMG device or communicate with a PMG device on which application software 1122 is executed. The PMG architecture comprises a PMG server that can wirelessly communicate with a number of PMG enabled devices within the personal area of the user, thus providing a personal area network (PAN).

In addition, the PMG server can wirelessly communicate with remote server systems, such as a service provider or communications server 100, via a wireless system or communications network in a WAN. Thus, the PMG acts as an interface to seamlessly connect a PAN to a WAN, and as such the devices attached to the PAN or WAN can communicate with each other. A more detailed description of the PMG architecture is provided in U.S. patent application Ser. No. 09/850,399, filed on May 7, 2001, the entire content of which is hereby incorporated by reference here.

As used herein, the terms service provider, communications server and communications network are to be viewed as designations of one or more computing environments that comprise application, client or server software for servicing requests submitted by respective software included in mobile devices 110, 120, or other computing systems connected thereto. These terms are not to be otherwise limiting in any manner. Application software 1122, for example, may be comprised of one or more modules that execute on one or more computing systems, as provided in further detail below.

Figure 3A:
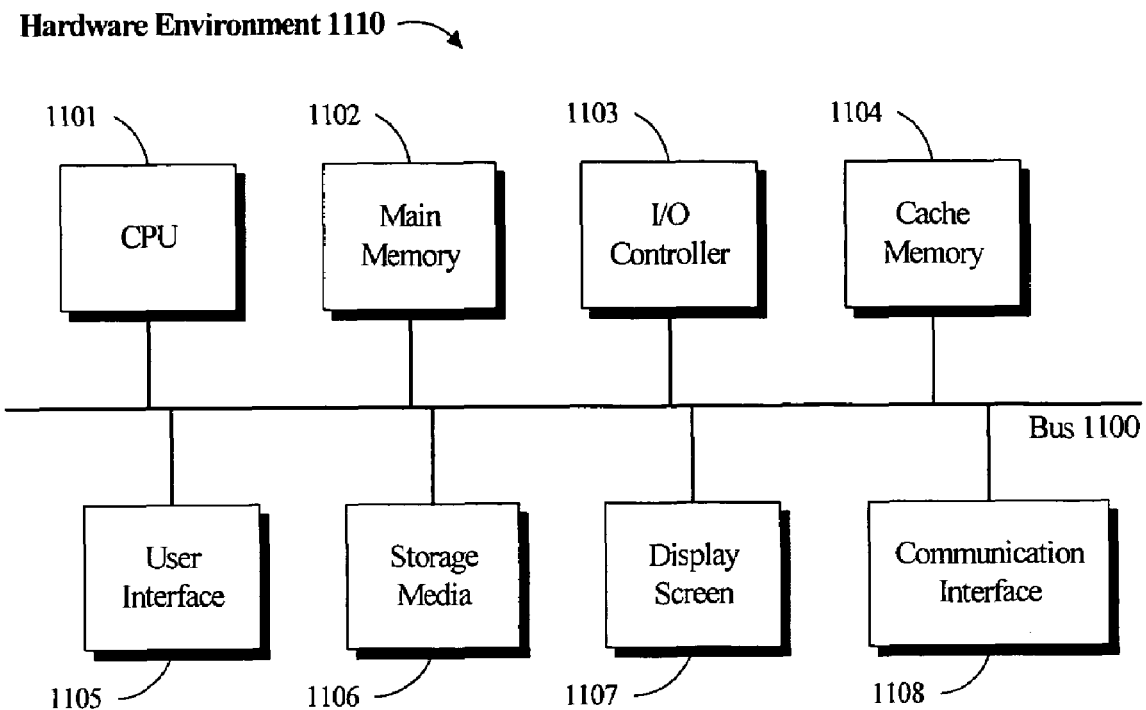
FIGS. 3A and 3B are block diagrams of hardware and software environments in which a system of the present invention may operate, in accordance with one or more embodiments.

Referring to FIGS. 1 and 3A, in accordance with one aspect of the invention, application software 1122 may be implemented on a device or system other than mobile device 110, 120. For example, application software 1122 or its components may be implemented, installed, uploaded and executed either in a local or in a distributed environment that are inclusive or exclusive of mobile device 110, 120 or communication server 100.

For example, certain components of the application software 1122 may be installed and executed on mobile devices 110 or 120, while other components may be executed and installed on a PMG device, communications server 100, internet portals, service provider server systems, a telephony switching system or other computer systems and networks attached thereto to update data or control occurrence of events on mobile device 110, for example.

The term "event" as used herein refers to one or more actions, functions, programs or processes that may be executed on mobile device 110 such as playing a ring tone, alarm or other audio at a designated time. Other exemplary time triggered events may comprise displaying an image or video, activating the vibration mode of the mobile device 110, initiating a call to a specific number, accessing content on a network server, and sending text, voice or data messages. Certain events may be directly triggered by an action of a user or occurrence of another event, rather than expiration of a designated time.

In one embodiment, the event constitutes a request or command to mobile device 110 to synchronize or update data stored in mobile device 110 with another computing system. The command or request may enable or disable specific functions on mobile device 110, activate ring tones, correct time, or cause mobile device 110 to receive or transmit data (e.g., text, image, audio, video, html, xml, etc.), for example.

In certain embodiments, the command or request may be utilized to automatically set mobile device 110 in a particular mode (e.g., vibration mode, meeting mode, etc.) with or without informing the user of mobile device 110. In other embodiments, the command or request can include a time or delay parameter T, such that the respective mode or function is activated at a set time or expiration of a threshold period.

In the following, one embodiment of the invention is described, by way of example, as applicable to commands or requests implemented in form of a text message transmitted over the SMS protocol. Application software 1122 executed on mobile device 110 is configured to process the received text message and cause mobile device 110 to perform the respective function or trigger a particular event as indicated in the text message.

It should be noted, however, that the scope of the invention is not limited to application software 1122 exclusively executed on mobile device 110, or commands or requests implemented as text messages transmitted over the SMS protocol. In other embodiments, commands may be sent over any type of data communication protocol in text format or otherwise, and may be processed by application software 1122 executed on communication server 100, for example.

Figure 2:
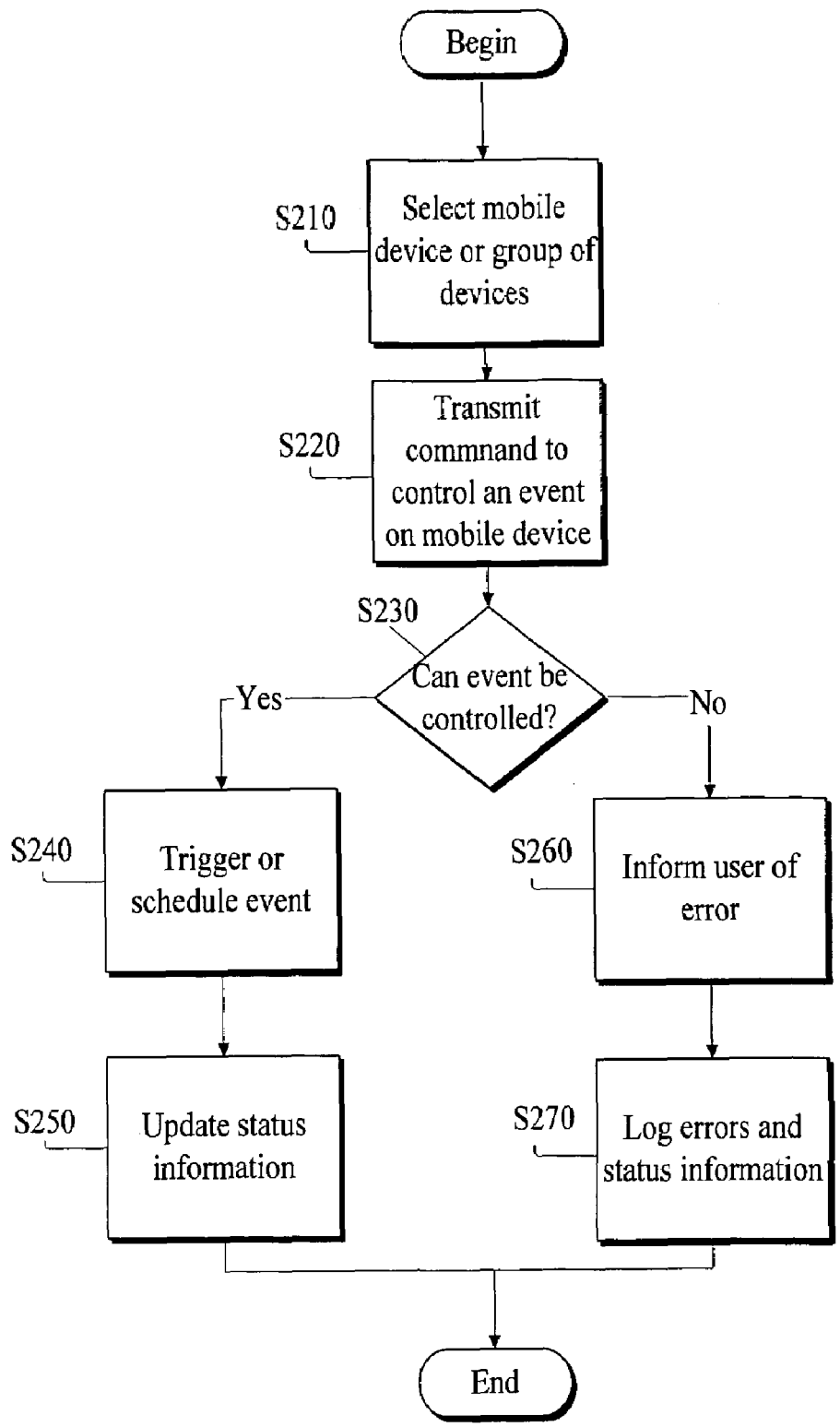
FIG. 2 is a flow diagram of a method for controlling events on a mobile communication device, in accordance with one or more embodiments.

Referring to FIGS. 1 and 2, in accordance with one aspect of the invention, a user may interact with a computing device (e.g., mobile device 120) to control and event on a mobile device 110 or group of devices (S210). In an exemplary embodiment, selection of mobile device 110 is performed by sending a text message via an SMS protocol to a phone number or other address (e.g., IP address) identifying mobile device 110 (S220). The text message comprises one or more commands that can be processed by application software 1122 to control an event (e.g., setting an alarm) on mobile device 110.

As noted earlier, depending on implementation, application software 1122 may be executed on one or both of communication server 100 and mobile device 110 to receive and process the text message comprising the commands for controlling occurrence of an event on mobile device 110. Thus, in accordance with one embodiment, application software 1122 processes the text message and determines if the event can be controlled or triggered based on the current settings or configuration of mobile device 110 (S230).

Triggering an event may require performing or accessing a prerequisite functions or data. For example, activating the alarm with a specific tone may require uploading the tone first, or setting the correct time on mobile device 110. If the event cannot be controlled due to the unavailability of a prerequisite function or data, then an error is generated to inform the user, for example (S260) and the generated error is logged in either communication server 100 or mobile device 110 (S270). The occurrence of the error may be displayed on the requesting system (e.g., mobile device 120).

If application software 1122 determines that the requested event can be controlled on mobile device 110, then the event is either triggered or scheduled for a future time in accordance with the content of the text message (S250). After verifying that the event has been successfully set or triggered, the application software 1122 updates the status information (250). The status information may, for example, be transmitted to mobile device 120 for confirmation.

In one embodiment, application software 1122 processes the text message and causes the designated event to be triggered in real time. For example, in one implementation, the user may drag-and-drop a contact entry from his MS Outlook into an interactive text messaging interface (e.g., a graphically displayed box) to cause a text message to be sent to mobile device 110 to dial a number in the contact entry. Once the text message is received by mobile device 110, then the number is dialed in real time.

Some events, on the other hand, can be scheduled for future triggering. For example, a user may drag and drop a calendar entry into a graphic user interface to send a text message mobile device 110. The text message as processed by mobile device 110 will result in calendaring a meeting and for the alarm to sound on mobile device 110 at the scheduled meeting time.

In embodiments of the system, mobile devices, service provider servers, and communications servers comprise a controlled computing system environment that can be presented largely in terms of hardware components and software code executed to perform processes that achieve the results contemplated by the system of the present invention. A more detailed description of such system environment is provided below with reference to FIGS. 3A and 3B.

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments of the invention.

Software environment 1120 is divided into two major classes comprising system software 1121 and application software 1122. System software 1121 comprises control programs, such as the operating system (OS) and information management systems that instruct the hardware how to function and process information. Application software 1122 is a program that performs a specific task such as detecting changes in configuration data stored in mobile device 110 and reporting the updated data to the service provider.

Referring to FIG. 3A, an embodiment of the application software 1122 can be implemented as computer software in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a network card, a blue tooth port, a modem, or an integrated services digital network (ISDN) card, etc.), and a system synchronizer (e.g., a clock, not shown in FIG. 3A).

Cache memory 1104 is utilized for storing frequently accessed information. A communication mechanism, such as a bidirectional data bus 1100, can be utilized to provide for means of communication between system components. Hardware Environment 1110 is capable of communicating with local or remotes systems connected to a communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 1110 may also be embodied in an embedded system such as a set-top box, a personal data assistant (PDA), a wireless mobile device (e.g., cellular phone), or other similar hardware platforms that have information processing and/or data storage and communication capabilities. For example, in one or more embodiments of the system, hardware environment 1110 may comprise a PMG unit or an equivalent thereof.

In embodiments of the system, communication interface 1108 can send and receive electrical, electromagnetic, or optical signals that carry digital data streams representing various types of information including program code. If communication is established via a communications network, hardware environment 1110 may transmit program code through the network connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are memory cards, CD-ROM disks, ROM cards, floppy disks, magnetic tapes, computer hard drives, and network server systems.

In one or more embodiments of the invention, processor 1101 is a microprocessor manufactured by Motorola, Intel, or Sun Microsystems Corporations, for example. The named processors are for the purpose of example only. Any other suitable microprocessor, microcontroller, or microcomputer may be utilized.

Figure 3B:
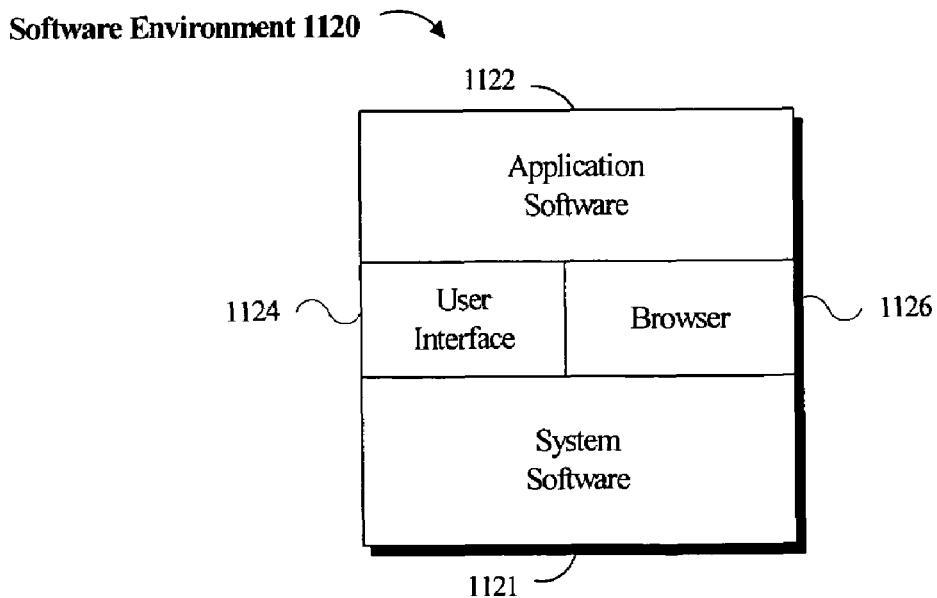

Referring to FIG. 3B, software environment 1120 is stored in storage media 1106 and is loaded into memory 1102 prior to execution. Software environment 1120 comprises system software 1121 and application software 1122. Depending on system implementation, certain aspects of software environment 1120 can be loaded on one or more hardware environments 1110.

System software 1121 comprises control software, such as an operating system that controls the low-level operations of hardware environment 1110. Low-level operations comprise the management of the system resources such as memory allocation, file swapping, and other core computing tasks. In one or more embodiments of the invention, the operating system can be Nucleus, Symbian, Microsoft Windows CE, Microsoft Windows NT, Macintosh OS, or IBM OS/2. However, any other suitable operating system may be utilized.

Application software 1122 can comprise one or more computer programs that are executed on top of system software 1121 after being loaded from storage media 1106 into memory 1102. In a client-server architecture, application software 1122 may comprise client software and server software. Referring to FIG. 1 for example, in one embodiment of the invention, client software is executed on mobile unit 110 and server software is executed on the service provider system (not shown) or communications server 100.

Software environment 1120 may also comprise web browser software 1126 for accessing content on a remote server. Further, software environment 1120 may comprise user interface software 1124 (e.g., a Graphical User Interface (GUI)) for receiving user commands and data. The received commands and data are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods that facilitate remotely controlling events on a mobile communication device. In this exemplary embodiment, logic code for performing these methods is implemented in the form of, for example, application software 1122. The logic code, in one embodiment, may be comprised of one or more modules that execute on one or more processors in a distributed or non-distributed communication model.

It should also be understood that the programs, modules, processes, methods, and the like, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure.

The methods of the present invention may be performed in either hardware, software, or any combination thereof. In particular, some methods may be carried out by software, firmware, or macrocode operating on a computer or computers of any type. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A method of controlling an event on a mobile communication device, the method comprising:
   receiving a message communicated over a wireless communication network;
   converting the message to a command executable by a processor of a mobile communication device; and
   executing the command on the mobile communication device,
   wherein the command is received over any type of data communication protocol in text format or otherwise,
   wherein executing the command triggers performance of a first event that controls one or more functions, programs, or processes of the mobile communication device,
   wherein the first event is unrelated to recognizing and displaying character image information in the message,
   wherein the first event is triggered at a scheduled time or in real-time in response to user action or occurrence of a second event,
   wherein timing for triggering the performance of the first event is in accordance with content of the message.

2. The method of claim 1, wherein the receiving, converting, and executing are performed by the mobile communication device.

3. The method of claim 1, wherein the message is communicated over a text messaging protocol.

4. The method of claim 1, wherein the message is communicated over short text messaging (SMS) protocol.

5. The method of claim 1, wherein the wireless communication network comprises a cellular communication network.

6. The method of claim 1, wherein the mobile communication device is a cellular telephone.

7. The method of claim 1, wherein the first event is a request to update data stored in the mobile device with data stored in another computing system.

8. The method of claim 1, wherein the first event is a request to automatically set the mobile communication device to a particular mode.

9. An apparatus for controlling an event on a mobile communication device, the apparatus comprising:
   means for receiving a message communicated over a wireless communication network;
   means for converting the message to a command executable by a processor of a mobile communication device; and
   means for executing the command on the mobile communication device,
   wherein the command is received over any type of data communication protocol in text format or otherwise,
   wherein executing the command triggers performance of a first event that controls one or more functions, programs, or processes of the mobile communication device,
   wherein the first event is unrelated to recognizing and displaying character image information in the message,
   wherein the first event is triggered at a scheduled time or in real-time in response to user action or occurrence of a second event,
   wherein timing for triggering the performance of the first event is in accordance with content of the message.

10. The apparatus of claim 9, wherein the message is communicated over a text messaging protocol.

11. The apparatus of claim 9, wherein the message is communicated over short text messaging (SMS) protocol.

12. The apparatus of claim 9, wherein the wireless communication network comprises a cellular communication network.

13. The apparatus of claim 9, wherein the mobile communication device is a cellular telephone.

14. The apparatus of claim 9, wherein the first event is a request to update data stored in the mobile device with data stored in another computing system.

15. The apparatus of claim 9, wherein the first event is a request to automatically set the mobile communication device to a particular mode.

* * * * *